(12) United States Patent
Orel (10) Patent No.: US 11,066,986 B2
(45) Date of Patent: Jul. 20, 2021

(54) INTERNAL COMBUSTION ENGINE

(71) Applicant: Aleksei Mihailovich Orel, g. Novosibirsk (RU)

(72) Inventor: Aleksei Mihailovich Orel, g. Novosibirsk (RU)

( * ) Notice: Subject to any disclaimer, the term of this patent is extended or adjusted under 35 U.S.C. 154(b) by 60 days.

(21) Appl. No.: 16/607,929

(22) PCT Filed: Mar. 7, 2019

(86) PCT No.: PCT/RU2019/000148
§ 371 (c)(1),
(2) Date: Oct. 24, 2019

(87) PCT Pub. No.: WO2019/177494
PCT Pub. Date: Sep. 19, 2019

(65) Prior Publication Data
US 2020/0284188 A1    Sep. 10, 2020

(30) Foreign Application Priority Data
Mar. 13, 2018    (RU) .......................... RU2018108859

(51) Int. Cl.
*F02B 55/14*    (2006.01)
*F01C 1/06*    (2006.01)

(52) U.S. Cl.
CPC ................ *F02B 55/14* (2013.01); *F01C 1/06* (2013.01)

(58) Field of Classification Search
CPC .......... F02B 55/14; F02B 55/02; F02B 53/00; F01C 1/06; F01C 1/08
USPC .................. 123/240, 246, 249; 418/196, 188
See application file for complete search history.

(56) References Cited

U.S. PATENT DOCUMENTS

| | | | | |
|---|---|---|---|---|
| 274,479 A | * | 3/1883 | Forbes | F01C 19/10 418/196 |
| 1,046,280 A | * | 12/1912 | Diefenderfer | F02B 53/00 418/196 |
| 1,058,331 A | * | 4/1913 | Cummins et al. | F01C 1/344 418/196 |
| 1,095,190 A | * | 5/1914 | Cummins | F02B 53/00 418/196 |

(Continued)

FOREIGN PATENT DOCUMENTS

| | | | | |
|---|---|---|---|---|
| DE | 3543944 A1 | 6/1987 | | |
| GB | 298342 A | * | 10/1928 | F02B 53/00 |

(Continued)

*Primary Examiner* — Thai Ba Trieu
(74) *Attorney, Agent, or Firm* — Muncy, Geissler, Olds & Lowe, P.C.

(57) ABSTRACT

A rotary internal combustion engine that has a housing, main rotors with an external cylindrical surface with rigidly fixed gear wheels and blades in the form of gear ledges (protrusions), as well as additional rotors with an external cylindrical surface with rigidly fixed gear wheels and recesses corresponding to the size of the blades on the main rotors. Additionally, the engine includes a unit for preparing and igniting the working mixture and a unit for discharging exhaust gases. Moreover, the circumference values of the main and additional rotors do not match, and are multiples of the length L1 between the nearest points of tangency (physical contact) of the center of the surface of the gear ledge with the housing.

1 Claim, 6 Drawing Sheets

(56) References Cited

U.S. PATENT DOCUMENTS

| | | | | |
|---|---|---|---|---|
| 1,226,745 A * | 5/1917 | Brooks | F02B 53/00 | |
| | | | 418/196 | |
| 1,239,694 A * | 9/1917 | Jackman et al. | F02B 53/00 | |
| | | | 123/246 | |
| 1,644,259 A * | 10/1927 | Lyon | B60K 5/00 | |
| | | | 418/196 | |
| 2,088,121 A * | 7/1937 | Swink | F02B 53/00 | |
| | | | 123/232 | |
| 2,152,564 A * | 3/1939 | Perkins | F01C 1/20 | |
| | | | 418/196 | |
| 3,116,666 A * | 1/1964 | Scott | F02B 53/00 | |
| | | | 418/196 | |
| RE27,191 E * | 10/1971 | Skrob | F02B 53/00 | |
| | | | 418/196 | |
| 3,621,820 A * | 11/1971 | Newsom | F02B 53/00 | |
| | | | 123/246 | |
| 3,701,254 A * | 10/1972 | Michejda | F02B 53/00 | |
| | | | 123/249 | |
| 3,780,710 A * | 12/1973 | Przybylski | F02B 53/04 | |
| | | | 123/246 | |
| 3,852,001 A * | 12/1974 | Miller | F01C 21/18 | |
| | | | 418/196 | |
| 3,941,527 A * | 3/1976 | Allington | F01C 1/20 | |
| | | | 418/196 | |
| 6,003,486 A | 12/1999 | Vanmoor | | |
| 6,142,758 A * | 11/2000 | Taggett | F01C 1/20 | |
| | | | 418/196 | |
| 6,488,004 B1 | 12/2002 | Adamovski | | |
| 10,047,668 B2 * | 8/2018 | Nagy | F02B 53/02 | |
| 2014/0190446 A1* | 7/2014 | Lawson, Jr. | F01C 1/123 | |
| | | | 123/200 | |

FOREIGN PATENT DOCUMENTS

| | | |
|---|---|---|
| RU | 2135778 U1 | 8/1999 |
| RU | 35370 U1 | 1/2004 |
| RU | 134243 | 11/2013 |

* cited by examiner

INTERNAL COMBUSTION ENGINE

CROSS REFERENCE TO RELATED APPLICATIONS

This nonprovisional application is a continuation of International Application No. PCT/RU2019/000148, which was filed on Mar. 7, 2019, and which claims priority to Russian Patent Application No. 2018108859, which was filed in Russia on Mar. 13, 2018, and which are both herein incorporated by reference.

BACKGROUND OF THE INVENTION

Field of the Invention

The inventive utility model relates to mechanical engineering, more specifically to internal combustion engines, designed to convert thermal energy into mechanical work, and more specifically to rotary engines.

Description of the Background Art

A rotary internal combustion engine with radial blades is known (U.S. Pat. No. 6,003,486 published 21 Dec. 1999), which engine comprises a housing with at least one section of the cylindrical inner surface, the main rotor with at least one section of the cylindrical external surface and at least one blade protruding above the cylindrical surface, at least one additional rotor, a system for preparing and igniting the working mixture, and a system for discharging exhaust gases.

A disadvantage of the known engine is its low operational efficiency.

The closest analogue to the claimed engine is an internal combustion engine (Patent RU 134243 published 10 Nov. 2013) comprising a housing with at least one section of a cylindrical inner surface, the main rotor with at least one section of a cylindrical external surface and at least one blade protruding above the cylindrical surface, at least one additional rotor, a system for preparing and igniting the working mixture, and a system for discharging exhaust gases. The additional rotor comprises at least one section of the cylindrical external surface, the diameter of which section is equal to the diameter of the section of the cylindrical external surface of the main rotor, and contains at least one recess with size corresponding to the size of the blade on the main rotor.

In connection with the design limitations of the analogue, due to restrictions in the ratio of the diameters of the rotors of the engine, another disadvantage of the known prototype is the low operational efficiency.

The purpose of the claimed utility model is to eliminate the identified disadvantage in order to achieve such a technical result as increasing the operational efficiency of the internal combustion engine.

SUMMARY OF THE INVENTION

This goal is achieved as follows: an internal combustion engine comprising a housing, main rotors with an external cylindrical surface with rigidly fixed gear wheels and blades in the form of gear ledges, additional rotors with an external cylindrical surface with rigidly fixed gear wheels and recesses corresponding to the size of the blades on the main rotors; a unit for preparing and igniting the working mixture, a unit for discharging exhaust gases, while the circumference values of the main and additional rotors do not match and are multiples of the length $L_1$ between the nearest points of tangency of the center of the surface of the gear ledge with the housing, wherein the number of blades in the form of gear ledge N corresponds to the formula $L_2/L_1=N$, and the ratio of the number of teeth of the rigidly fixed gear wheels of the rotors is calculated by the formula $z_2/z_1=N$, where $L_2$ is the circumference of the main rotor, $z_2$ is the number of teeth of the gear wheel of the main rotor, $z_1$ is the number of teeth of the gear wheel of the main rotor that fit on the length $L_1$.

The internal combustion engine can in particular be characterized in that the number of additional rotors does not exceed the number of gear ledges.

The internal combustion engine in particular may be characterized in that the main rotor, which comprises external cylindrical surface, rigidly fixed gear wheel, and the blade in the form of gear ledge, is made as a monolithic element.

The internal combustion engine in particular may be characterized in that the additional rotor, which comprises an external cylindrical surface, rigidly fixed gear, and a recess corresponding to the size of the blade on the main rotor, is made as a monolithic element.

The internal combustion engine in particular can be characterized in that the additional rotors are arranged uniformly around the circumference of the main rotor, at intervals s calculated by the formula $s=360/N$.

BRIEF DESCRIPTION OF THE DRAWINGS

1. housing.
2. main rotor.
3. additional rotor.
4. section with the external cylindrical surface of the main rotor.
5. section with the external cylindrical surface of the additional rotor.
6. intake valve through which the combustible mixture is injected.
7. spark plug.
8. outlet through which exhaust gases freely exit.
9. blade in the form of gear ledge on the external surface of the main rotor of the engine.
10. recess on the external surface of the additional rotor, which recess may comprise a through hole connecting the working cavity with the environment.
11. gear wheel rigidly fixed to the additional rotor.
12. gear wheel rigidly fixed to the main rotor.
13. hole connecting the working cavity with the environment.
14. length L1.
15. circumference L2.
16. the environment.
17. circumference of the additional rotor.
18. gear teeth z1.
19. total gear teeth z2.
20. working cavity.

DETAILED DESCRIPTION

The internal combustion engine represented in the figures is arranged as follows.

Housing 1 is a part with cylindrical bores under the main 2 and additional 3 rotors located with a gap. On the external cylindrical surface 4 of the main rotor, there is a blade in the form of gear ledge 9, which is in contact with the inner surface of the bore of the housing 1. On the external cylindrical surface 5 of the additional rotor, there is a recess 10 that provides free synchronous passage of the ledge 9 of the rotor 2, while maintaining tight contact of the rotors along their external circumference for the formation of the working chamber of the engine. An intake valve through which the combustible mixture 6 is injected and the spark plug 7, which ignites the mixture, are located on the housing 1. The exhaust gases exit through the outlet 8. The rotation movement from the main rotor to the additional one is transmitted using gears 11 and 12 that are rigidly fixed to the rotors. The diameter of the gear wheel of the main rotor 12 corresponds to the diameter of the section with the external cylindrical surface of the main rotor 4, and the diameter of the gear wheel rigidly fixed to the additional rotor 11 corresponds to the diameter of the section with the external cylindrical surface of the additional rotor 5.

The internal combustion engine represented in the figures operates as follows.

When the blade 9 is moving, from the moment of its passing the recess 10 to the location of the intake valve 6, air is sucked (or pumped from the compressor) into the working cavity 20 through the hole 13 in the additional rotor. The moment of passage by the blade 9 of the intake valve 6 coincides with the moment of closing of the recess 10 during rotation of the section with the cylindrical external surface of the additional rotor 5, which acts as a disk shutter. With further movement of the blade, the combustible mixture is injected into the working cavity 20 through the intake valve 6, which mixture is ignited when the blade 7 passes the spark plug, while the expanding gas acting on the blade 9 generates a torque effect on the main rotor 2. The rotary piston moving in the direction of the outlet 8 displaces the exhaust gases formed by the previous combustion of the combustible mixture through the outlet 8.

Figure 1:
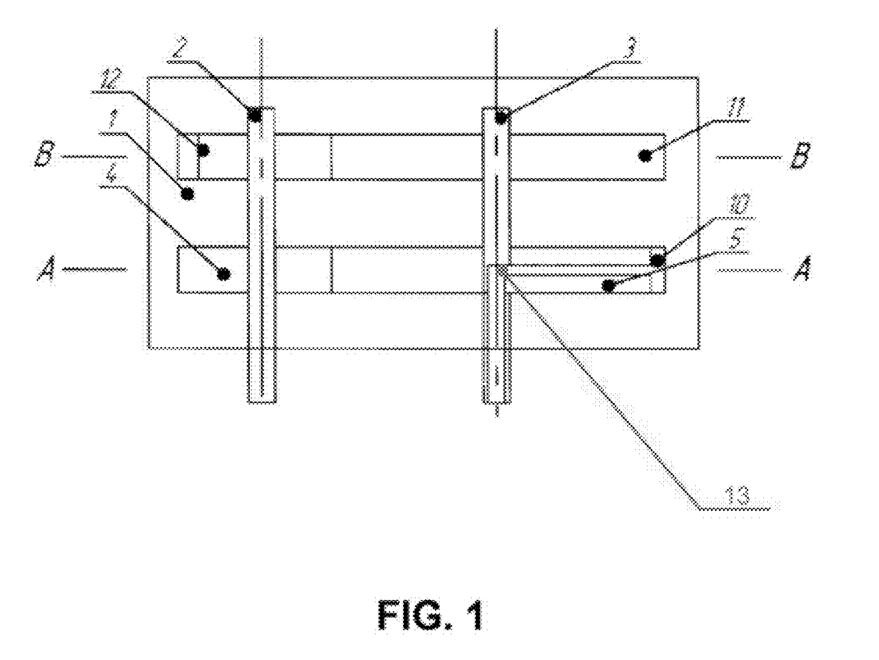
FIG. 1 shows a structural diagram of the provided engine (horizontal section is a top view)
Figure 2:
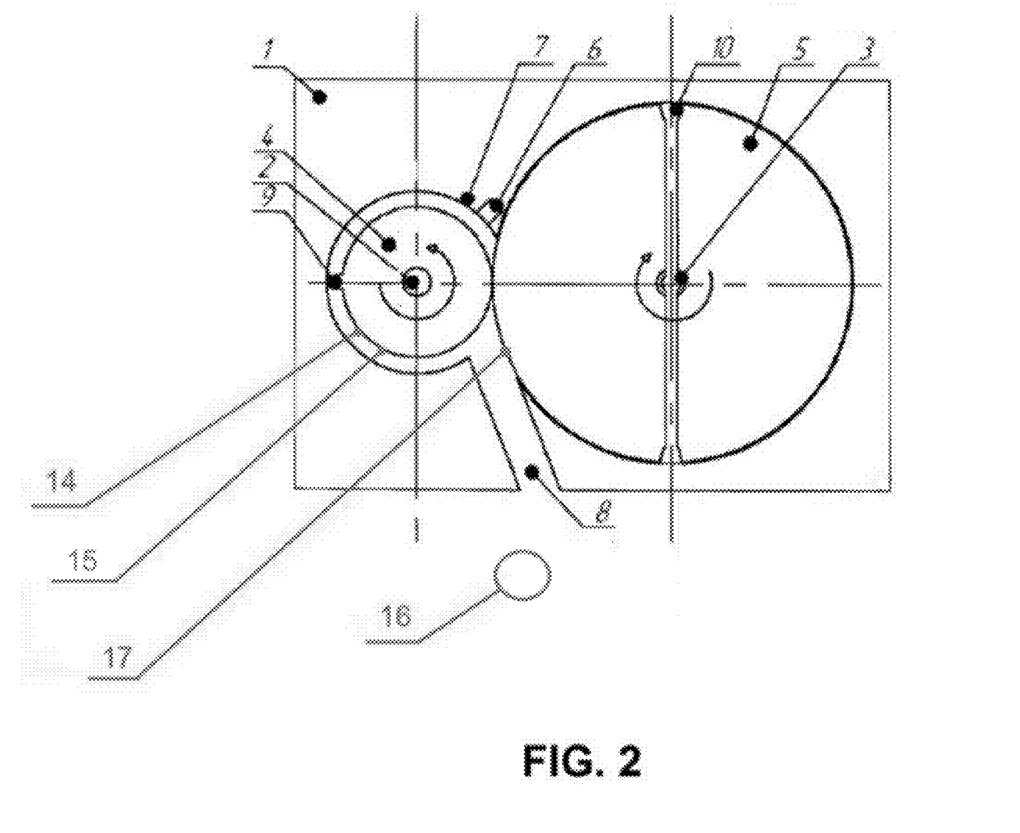
FIG. 2 shows section A-A (front view)
Figure 3:
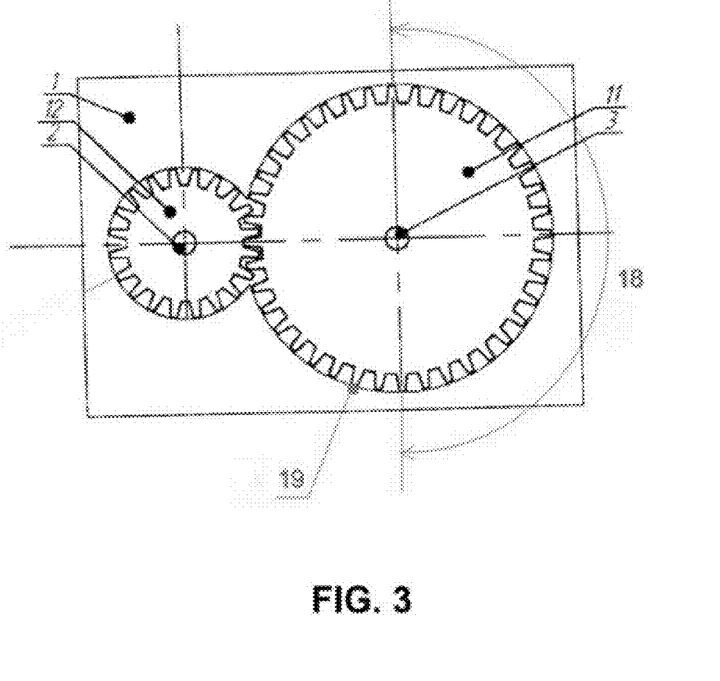
FIG. 3 shows section B-B (back view)
Figure 4:
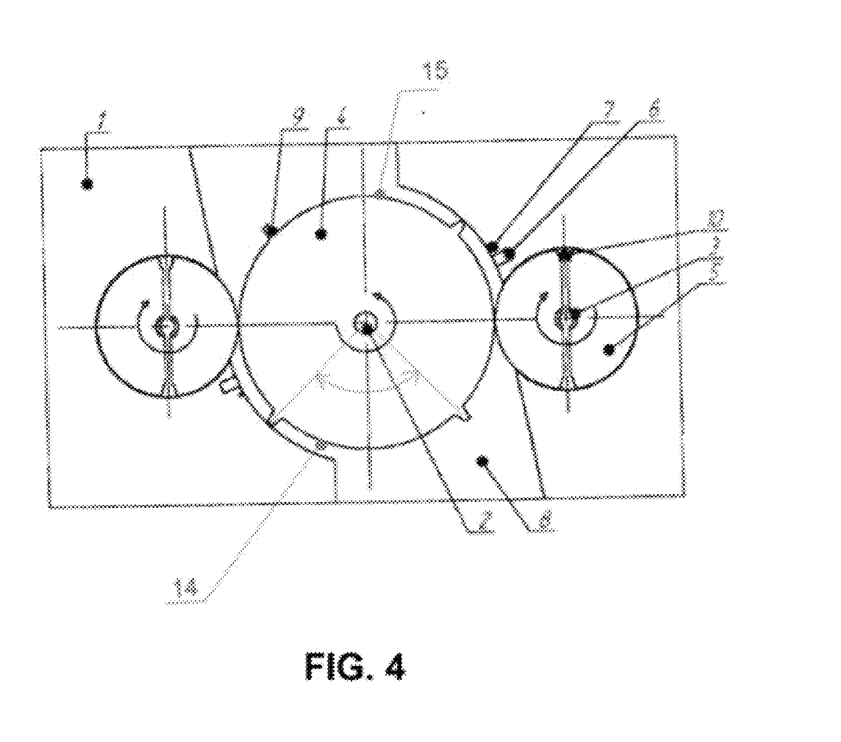
FIG. 4 and FIG. 5 show an example of possible schemes of the provided engine for the number of rotary pistons other than one (in these examples, for n=2 and n=4, the section is a front view)
Figure 5:
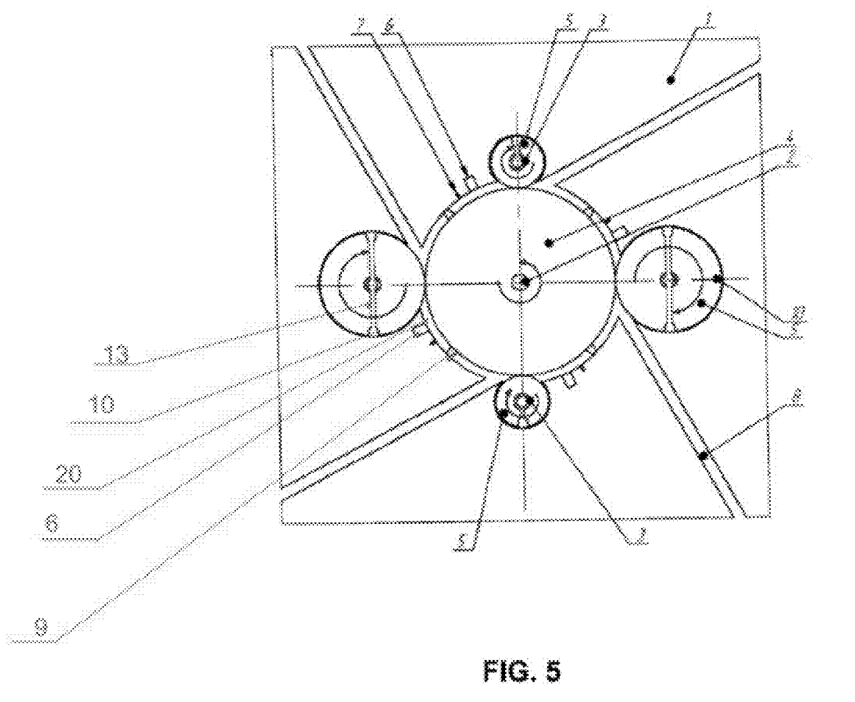
Figure 6:
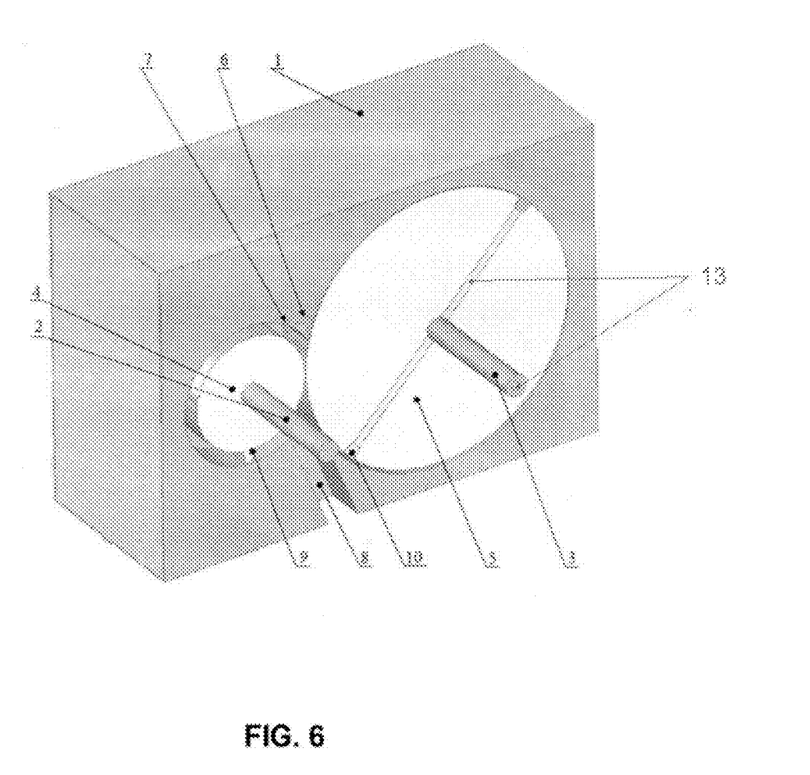
FIG. 6 shows a general view of the engine in 3D projection, where the numbers indicate the following.

In order to increase the efficiency of the engine operation, an increase in torque effect is achieved, due to increasing the compression ratio, by means of reducing the volume of the combustion chamber, since greater compression is easier to achieve due to the small volume. In the claimed engine, this problem can be solved, for example, by dividing the working chamber of the engine into equal sectors, by arranging blades in the form of gear ledge on the main rotor, equidistant from each other at intervals $L_1$ 14. At the same time, N gear ledges fit along the entire circumference of the main rotor $L_2$ 15. Since the rotor comprises a rigidly fixed gear wheel, the number N for the gear will correspond to the ratio of the total number of gear teeth $z_2$ 19 to the number of gear teeth $z_1$ 18 per gap $L_1$ 14. At the same time, the teeth of the interacting gears of the main and additional rotor correspond optimally to each other. Thus, it is possible to create engines of any configuration with optimally selected volumes of combustion chambers, which increases the overall efficiency of the engine operation. In addition, the geometric dimensions of the elements of the desired engine can be reduced, which, while maintaining the specified parameters in terms of power, allows to create more compact mechanisms. Since the rotation force of the main rotor, resulting from the combustion of fuel, transfers part of the energy to provide the rotation of additional rotors, that ensure the operating capacity of the engine. That, in some cases, design will be appropriate, such as, for example, presented in FIG. 5. A decrease in the mass of the additional rotor will cause an increase in the operational efficiency of the engine, due to the application of lower forces for its rotation.

Furthermore, the claimed ratios will be valid for additional rotors, and the number of recesses of the additional rotor will be determined as the ratio of the circumference value 15 to the length of the circular arc 14 between the nearest points of tangency of the center of the surface of the gear ledge with the housing. And the ratio of the number of teeth of the rigidly fixed gear wheels of the additional rotors will be determined as the total number of gear wheel teeth to the number of gear wheel teeth fit on the length of the circular arc 14 between the nearest points of tangency of the center of the surface of the gear ledge with the housing.

Furthermore, the presented internal combustion engine may be configured, for example, to the case of the location of several main rotors around an additional one, while the radii of the main rotors are less than the radius of the additional one. In this case, all the dependencies presented in the claims remain valid.

In order to increase the operational efficiency of the engine, ratios of the circumference values of the main and additional rotors do not match. Thus, it is possible to create an engine design in which the number of additional rotors will be equal to the number of gear ledges, and wherein additional rotor will comprise, for example, one recess. By reducing the circumference 17 of the additional rotor, both overcoming of the friction force of the rotor against the cylinder of the housing and the force moment that the main rotor must transmit to rotate the additional rotor are reduced, which undoubtedly increases the efficiency of the engine operation. In addition, with various circumference ratios, the "ledge-recess" combination works effectively, since all the elements become simultaneously involved.

In addition, in order to reduce the number of interacting elements, the main rotor, which comprises an external cylindrical surface, rigidly fixed gear wheel, and a blade in the form of gear ledge, can be made as a monolithic element, for example, by printing on a 3D printer. Moreover, an additional rotor, which comprises an external cylindrical surface, rigidly fixed gear wheel, and a recess corresponding to the size of the blade on the main rotor, can be made as a monolithic element.

Thus, the configuration of the rotary internal combustion engine using rotors with different circumference values of the working surfaces, allows to achieve the claimed technical result, namely, increasing the operational efficiency.

INDUSTRIAL APPLICABILITY

The inventive internal combustion engine can be successfully used in modern automotive transport or for the manufacture of gasoline electric generators. It is made at the enterprises of the automotive industry or other facilities of the machine-building industry.

What is claimed is:
1. An internal combustion engine comprising:
   a housing;
   a main rotor with an external cylindrical surface with blades in a form of gear ledges;
   additional rotors with an external cylindrical surface with recesses corresponding to a size of the blades on the main rotor;

a spark plug for igniting a combustible mixture being supplied via an intake valve; and an outlet for discharging exhaust gases;

wherein circumference values of the main rotor and each of the additional rotors do not match and are multiples of a length $L_1$, between nearest points of tangency of a center of a surface of each of the gear ledges with the housing;

wherein a number of the blades in a form of the gear ledges N corresponds to a formula L2/L1=N, where L2 is a circumference of the main rotor; and wherein a through hole is made in each of the recesses of said each of the additional rotors;

wherein the through hole connects a working cavity with an environment; and wherein said each of the recesses of said each of the additional rotors is closed during each of the blades passing the intake valve.

* * * * *